United States Patent [19]

Wendland et al.

[11] Patent Number: 4,723,157
[45] Date of Patent: Feb. 2, 1988

[54] METHOD FOR A COMPATIBLE INCREASE IN RESOLUTION IN COLOR TELEVISION SYSTEMS

[75] Inventors: Broder Wendland, Waltrop; Berthold Eiberger, Darmstadt, both of Fed. Rep. of Germany

[73] Assignee: ANT Nachrichtentechnik GmbH, Backnang, Fed. Rep. of Germany

[21] Appl. No.: 680,292

[22] Filed: Dec. 10, 1984

[30] Foreign Application Priority Data

Dec. 9, 1983 [DE] Fed. Rep. of Germany ....... 3344524

[51] Int. Cl.⁴ .......................... H04N 11/06; H04N 7/08
[52] U.S. Cl. ........................................ 358/12; 358/142
[58] Field of Search ........................ 358/12, 141, 142

[56] References Cited

U.S. PATENT DOCUMENTS

| | | | |
|---|---|---|---|
| 2,716,151 | 7/1951 | Smith | 358/12 |
| 3,838,444 | 9/1974 | Loughlin et al. | 358/142 |
| 3,871,019 | 3/1975 | Bingham | 358/12 |
| 3,885,217 | 5/1975 | Cintron | 375/38 |
| 4,051,532 | 9/1977 | Hilbert et al. | 358/142 |
| 4,078,245 | 3/1978 | Johnson et al. | 358/142 |
| 4,521,803 | 6/1985 | Gittinger | 358/141 |
| 4,621,286 | 11/1986 | Reitmeier et al. | 358/12 |

FOREIGN PATENT DOCUMENTS 3233882  3/1984  Fed. Rep. of Germany .

OTHER PUBLICATIONS

Wendland, "Entwicklungsalternativen für Zukünftige Fernsehsysteme", Fernseh-und Kino-Technik, vol. 34, No. 2/1980, pp. 41–48.
Teer, "Investigations into Redundancy . . . ", Philips Res. Repts, 15, 1960, pp. 30–96.
Rawlings et al., "Multiplexed Analogue Components—A New Video . . . ", Electron. Eng. Assoc. IEEE Conf., Sep., 1982, IBC 82, pp. 158–164.
Wendland, "High Definition Television Studies . . . ", SMPTE-Journal Feb., 1981, pp. 151–164.
Hentschke, "Auflösungsgünstige Digitale Chromafilterung . . . ", NTZ-Archiv, vol. 5, No. 9, 1983, pp. 249–52.
Jackson et al., "Compatible Systems for High-Quality Television", SMPTE Journal, Jul., 1983, pp. 719–723.
Wendland, "Konzepte für Ein Kompatibles HiFi-Fernsehsystem", NTG-Fachberichte, vol. 74, Sep., 1980, pp. 407–461.
"Kompatibles Fernsehübertragungsverfahren Mit Erhöhter Auflösung", Neues Aus Der Technik, No. 16, Aug., 1982, p. 4.
Mersereau, Russell M., "The Processing of Hexagonally Sampled Two-Dimensional Signals," Proceedings of IEEE, vol. 67, No. 6, Jun 1979, pp. 930–949.
Clarke, C.K.P., "High Quality Decoding for Pal Inputs to Digital YUV Studios," Jul., 1982, British Broadcasting Corporation (BBC RD 1982/12), pp. 1–5.

Primary Examiner—James J. Groody
Assistant Examiner—Robert M. Bauer
Attorney, Agent, or Firm—Spencer & Frank

[57] ABSTRACT

In the transmission of a television signal containing a luminance signal between a transmitting station and a receiving station of a television system, the picture resolution at the receiving station is compatibly increased by: effecting planar prefiltering of the luminance signal at the transmitting station and a corresponding planar postfiltering of the luminance signal at the receiving station; effecting offset sampling or offset modulation of the luminance signal at the transmitting station and a corresponding sampling conversion or demodulation of the luminance signal at the receiving station; deriving an additional signal from the luminance signal for increasing picture resolution, reducing the amplitude of the additional signal at the transmitting station and transmitting the additional signal together with the original luminance signal to the receiving station; and increasing the amplitude of the additional signal at the receiving station to an extent corresponding to the reduction performed at the transmitting station.

18 Claims, 15 Drawing Figures

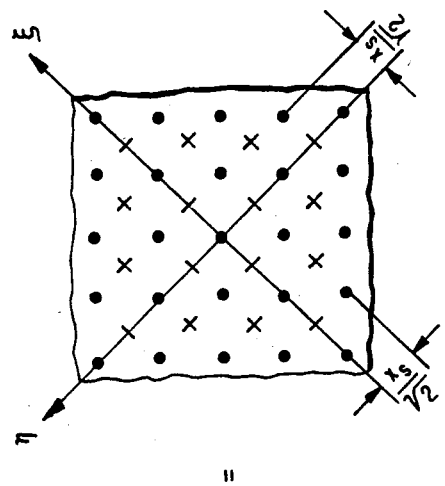
FIG.3c FULL FRAME
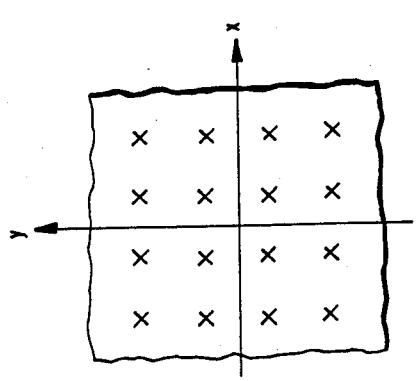
FIG.3b FIELD 2
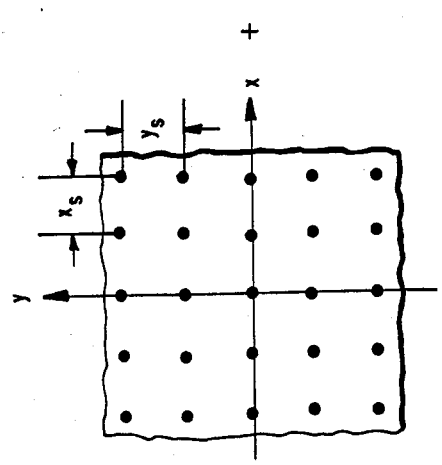
FIG.3a FIELD 1

METHOD FOR A COMPATIBLE INCREASE IN RESOLUTION IN COLOR TELEVISION SYSTEMS

BACKGROUND OF THE INVENTION

The present invention relates to a method for compatibly increasing resolution in television systems. Such a method is based on a system for increasing resolution as disclosed in an article by Broder Wendland entitled "Entwicklungsalternativen für zukünftige Fernsehsysteme", published in Fernsehund Kino-Technik, Volume 34, No. 2/1980, pages 41–48.

Present-day color television systems still have room for improvement in picture reproduction quality. Due to the single-channel transmission of the luminance signal and the modulated chrominance subcarrier, the added capability of reproducing colors results in a reduction in quality compared to the old black and white transmission systems. The effective resolution in the luminance channel of such systems is about 4 MHz (with reference to the 625-line standard).

With respect to future color television systems, it appears to be desirable to improve picture quality beyond its present state in a manner that is compatible with already existing systems.

A method of offset sampling with the aid of prior and subsequent planar filtering and full frame display is described in the above-cited publication in Fernseh- und Kino-Technik, Volume 34, No. 2/1980, pages 41–48 to compatibly improve detail resolution. The technique of offset sampling is also described, inter alia, by Mersereau in "The Processing of Hexagonally Sampled Two Dimensional Signals", published in Proceedings of IEEE, Vol. COM-27, Aug., 1979, pp 1239–1247. This method permits a considerable increase in horizontal resolution. Quality improvement in the vertical direction is attained by full frame reproduction. Compared to older papers on the subject of offset scanning (e.g. "Investigation into Redundancy and Possible Bandwidth Compression in Television Transmission", Philips Research Reports 15, 1960, pages 30–96), the use of prior and subsequent planar filtering and full frame display results in a fault-free increase in resolution in appropriately improved receivers.

With selection of a sampling method in the form of pulse amplitude modulation for signal transmission, the quality in the compatible receiver still suffers to a certain degree: the additional information present in the signal for detail resolution results in an additional 25 Hz flicker interference in existing systems (in 60 Hz systems, 30 Hz flicker interference). Insofar as the information for luminance and chrominance is not transmitted without crosstalk, offset sampling produces further crosstalk problems.

An article entitled "Multiplexed Analogue Components-A New Video Coding System For Satellite Broadcasting", by R. Rawlings and R. Morcom, published in Electron. Eng. Assoc., IEEE Conference, Brighton, England, Sept. 18–21, 1982, IBC 82, International Broadcasting Convention, XVI+376 P., at pages 158–164, discloses the reduction of space-time alias effects produced by the folded down high frequency spectrum in that the signal amplitude of the high frequency spectral components is lowered before folding down.

SUMMARY OF THE INVENTION

It is an object of the present invention to provide a method which makes possible signal transmission with increased detail resolution in an existing transmission system without creating undesirable, noticeable interference components.

The above and other objects are achieved, according to the present invention, in the context of transmission of a television signal containing a luminance signal between a transmitting station and a receiving station of a television system, by a method for compatibly increasing picture resolution at the receiving station, which method includes:

effecting planar prefiltering of the luminance signal at the transmitting station and a corresponding planar postfiltering of the luminance signal at the receiving station;

effecting offset sampling or offset Modulation of the luminance signal at the transmitting station and a corresponding sampling conversion or demodulation of the luminance signal at the receiving station; and deriving an additional signal from the luminance signal for increasing picture resolution and reducing the amplitude of the additional signal at the transmitting station, and transmitting the additional signal to the receiving station; and increasing the amplitude of the additional signal at the receiving station to an extent corresponding to the reduction performed during the reducing step.

The method according to the present invention has the advantage that the additional 25 Hz (or 30 Hz, respectively) flicker interference and possibly occurring crosstalk problems are avoided in a compatible receiver. The method according to the present invention does not entail any changes in bandwidth in existing transmission methods. Thus, the reproduction quality in a receiver operating under existing standards according to NTSC, SECAM or PAL remains entirely unchanged. In contradistinction to the prior art (e.g. Rawlings et al), signal reduction is advantageously effected after folding down.

The method according to the invention can be used for digital signal processing with offset sampling or alternatively for analog signal processing with offset modulation.

BRIEF DESCRIPTION OF THE DRAWING

The present invention will now be described in greater detail with reference to the drawing.

FIGS. 3a–3c are pictorial views of the local structure of the offset modulation frequency for locations of identical phases.

DESCRIPTION OF THE PREFERRED EMBODIMENTS

Figure 1:
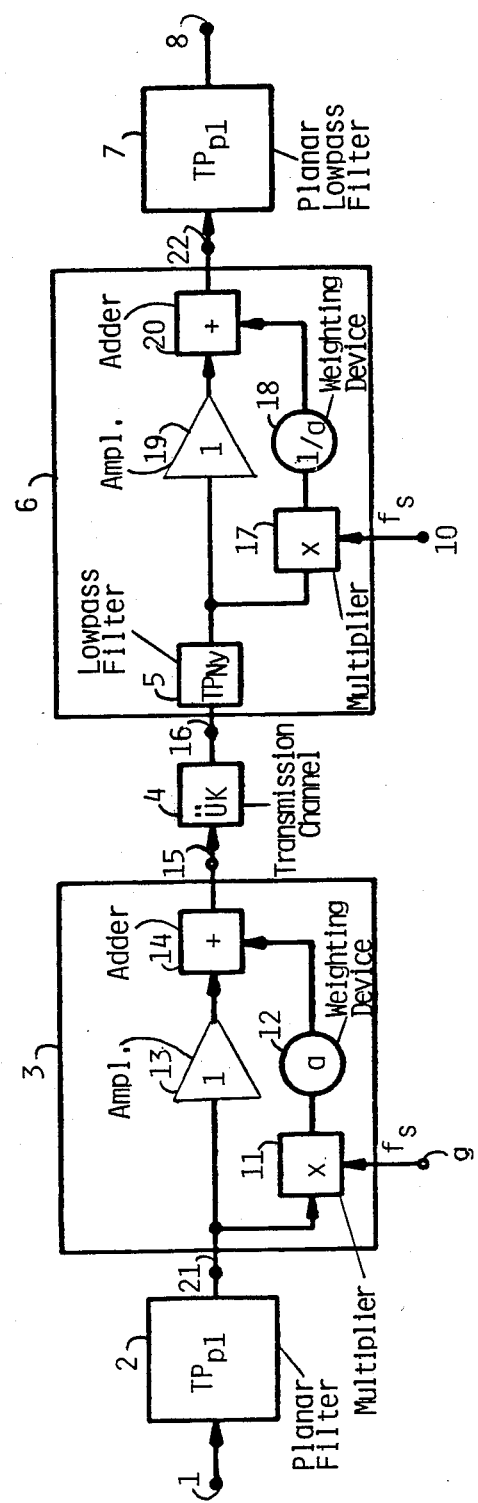
FIG. 1 is a block circuit diagram of one embodiment of a circuit for implementation of the method according to the present invention.

The block circuit diagram of FIG. 1 illustrates a system for implementing the method according to the present invention for the case of an offset modulation which is suitable for analog transmission system and alternatively for digital transmission systems described later. A monochrome video signal is fed to input terminal 1. By means of a planar filter 2, this monochrome video signal is planarly limited in bandwidth. The thus bandwidth limited signal appears at output terminal 21, and can be represented in the manner shown in FIG. 2. Other types of planar bandwidth limitation are likewise possible if their structures match one another without overlaps. For example, instead of the rhomboid bandwidth limitation shown in FIG. 2, a hexagonal or similar bandwidth limitation may be effected. The principles of the structure of planar filters together with the choice of appropiate filter coefficients are described, for example, by B. Wendland in "High Definition Television Studies on Compatible Basis with Present Standards, Television Technology in the 80's", Scarsdale, N.Y., SMPTE, 1981, pages 124–131, or in the paper by S. Hentschke, entitled "Auflösungsgünstige digitale Chromafilterung zur PCM-Übertragung von Videosignalen (Favorable Resolution from Digital Chromafiltering for PCM Transmission of Video Signals)", published in NTZ-Archiv, Volume 5, 1983, No. 9, pages 249–255. Planar filtering can be executed according to Hentschke using filter structures according to FIGS. 8 and 9 on page 255 and filter coefficient sets according to page 253 respectively.

Figure 2:
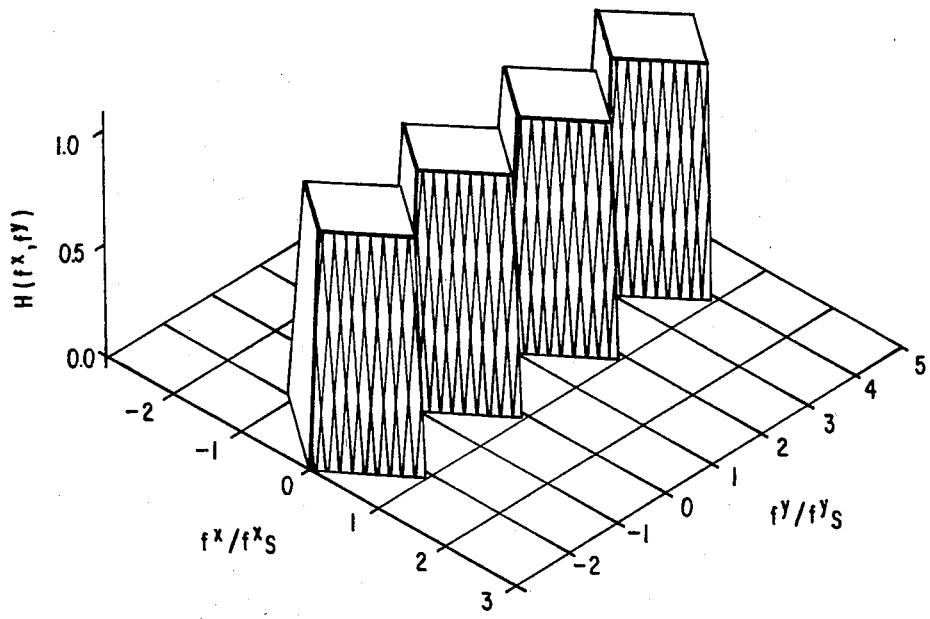
FIG. 2 is a three-dimensional representation of the luminance signal which has been planarly prefiltered at the transmitting end.

FIG. 2 is a three-dimensional representation of the bandwidth limited signal in an orthogonal coordinate system for the frequency plane $(f^x, f^y)$, with standardization with respect to $f_s^x$ and $f_s^y$, which define local frequencies for the modulation process to be described below. This standardization with respect to $f_s^x$ and $f_s^y$ is chosen for reasons of clearness. The $f^x$-spectrum corresponds to the x-axis and the $f^y$-spectrum to the y-axis relative to the two dimensional Fourier transform. X and y-axes correspond to the coordinates of the television picture to be processed. $H(f^x, f^y)$ is the Fourier transform of the system answer for filter 2 in the local frequency range.

The planarly prefiltered signal is now processed in a module 3 at the transmitting end in which the prefiltered signal is fed, via amplifier stage 13, to adder stage 14. At the same time, the prefiltered signal is modulated in an offset position by multiplier 11 with a signal at frequency $f_s$ supplied to terminal 9 and, after amplitude weighting by means of a weighting device 12 by, for example, the factor a=0.3, is likewise fed to adder stage 14.

The illustration of offset modulation frequency $f_s$ in the local range is shown in FIGS. 3. The offset modulation frequency $f_s$ always has a x and a y component, because of the fact that the picture decomposition is done in the two dimensions x and y. As before the coordinates x, y of FIGS. 3 correspond to the coordinates of the television picture to be processed. The locations of identical phase values of sinusoidal oscillations are shown within two successive fields. Circles and x's symbolize the locations of identical phase. As shown in FIG. 3a, the locations of identical phase in field 1 are given by the pairs of values $(m \cdot x_s; n \cdot y_s)$ in the x,y plane with m=0, 1, 2, 3, ... and n=0, 1, 2, 3 ... In field 2, however, as shown in FIG. 3b, the locations of identical phase are given by the pairs of values $(\frac{1}{2}+m)x_s$; $(\frac{1}{2}+n)y_s$. A full frame is composed of fields 1 and 2 and is shown in FIG. 3c. The offset modulation frequency in the x direction is selected to be, for example, $f_s^x=6.75$ MHz. This is half the clock pulse frequency of the sampling clock pulse proposed by CCIR for use in digital studios. For a 625-line interlace standard a vertical frequency in the y direction of $f_s^y=312.5$ c/ph results, irrespective of the selected frequency in x direction. FIG. 3c shows a further pair of mutually orthogonal reference axes $\eta$ and $\xi$ which are rotated by 45° relative to axes x and y. $\eta$ and $\xi$-axes are chosen only to simplify the demonstration in a full frame. A full explanation of $\eta$ and $\xi$-axes is published in SMPTE, Winter Conference, 1981, pages 124–131, Scarsdale, N.Y.

Offset modulation permits optimization of local resolution in the direction of the $f^x$ and $f^y$ axes with the aid of planar bandwidth limitation instead of the customary line interlacing method for the same quantity of information.

Generally, due to the requirement for compatibility, the signal spectrum must be transmitted over a channel having limited bandwidth. In the conventional television system, channel bandwidth limitation is effective in the direction of the x or $f^x$ axis, respectively. The spectra of conventionally orthogonally modulated signals can be transmitted quite well over such a channel. If channel bandwidth limitation is selected to be $f^x_g \geq \frac{1}{2} f^x_s$, the first harmonic of the spectrum of an orthogonally modulated line interlacing signal, for example, can still be transmitted completely. Transmission of a signal with planar bandwidth limitation according to FIG. 2, however, is not possible so easily if the channel is to be fully utilized. In such a case, offset modulation according to FIG. 3 is employed. For channel bandwidth limitation with $f^x_g \geq \frac{1}{2} f^x_s$, the desired signal information is transmitted completely, with part of the information not being transmitted in its original spectral position. By way of suitable periodic repetition of the spectrum it is possible, however, to reconstruct the orignal position of all spectral components at the receiving end. Renewed planar filtering, i.e. subsequent planar filtering at the receiving end, then suppresses the undesirable spectral components correspondingly. Periodic repetition of the transmitted signal spectrum is made possible by $f_s$ synchronous demodulation.

Figure 4:
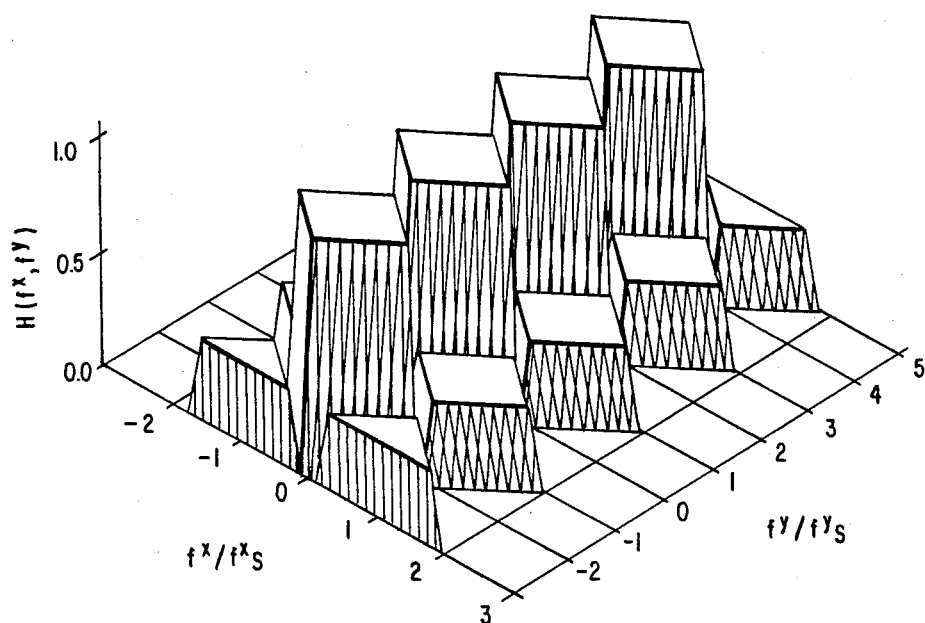
FIG. 4 is a view similar to that of FIG. 2 of the offset modulated signal at the transmitter output.
Figure 5:
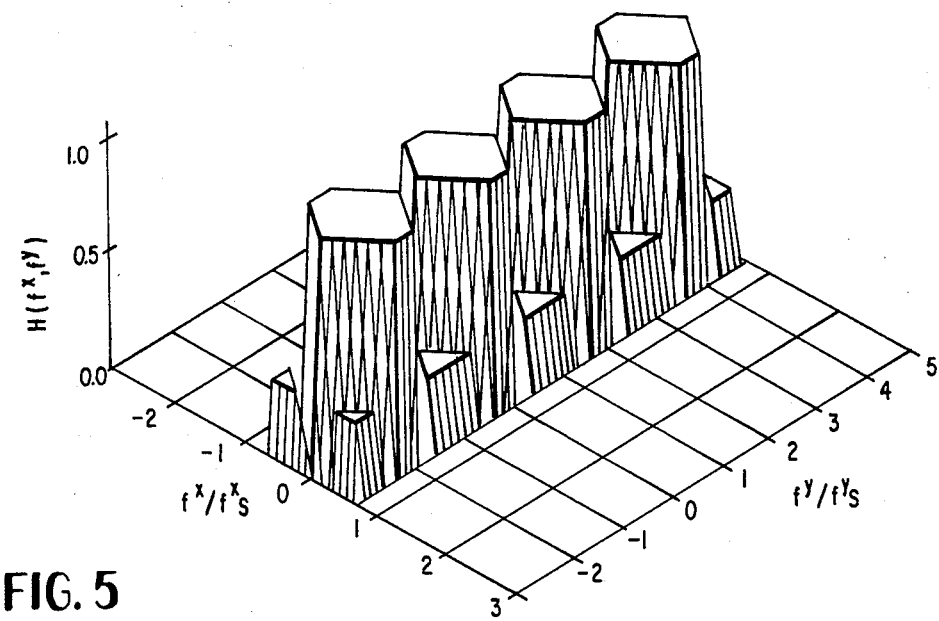
FIG. 5 is a view similar to that of FIG. 2 of the received signal after transmission.

At the output 15 of adder stage 14 a signal spectrum appears as shown in FIG. 4. The additional spectral components which have been reduced by the factor a=0.3 are clearly discernible. The thus processed transmitting signal is now transmitted over a bandwidth limited transmission channel 4. After transmission, the signal shown in FIG. 5, which has been bandwidth limited in transmission channel 4, appears at receiver input terminal 16.

Figure 6:
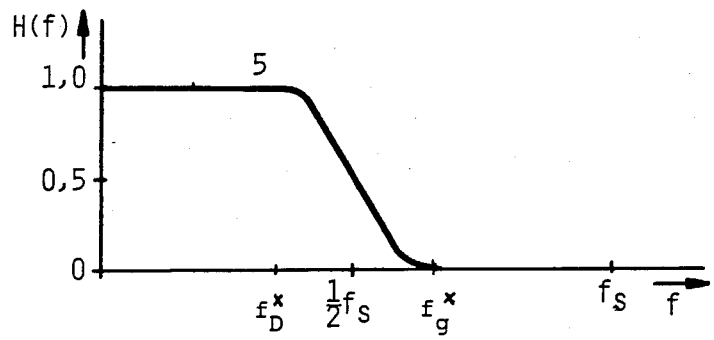
FIG. 6 is a signal diagram of the frequency response of the lowpass filter at the receiving end.

The received signal is suitably bandwidth limited by means of a suitable lowpass filter 5. Lowpass filter 5 is a filter having a Nyquist slope which is obliquely symmetrical with, i.e., is centered on, half the modulation frequency $f_s$, as shown in FIG. 6. For the previously selected offset modulation frequency ($f_s^x = 6.75$ MHz) this is $f^x{}_{NY} = 3.375$ MHz. The Nyquist slope then lies, for example, between $f_D{}^x \approx 3$ MHz and the cut-off frequency of $f_g{}^x \approx 3.7$ MHz, with $f_D{}^x$ representing the highest pass wave of the Nyquist filter where signal attenuation is not yet present and $f_g{}^x$ respresenting the cut-off frequency of the Nyquist filter. The Nyquist slope lies as can be seen from FIG. 6 between these two frequencies $f_D{}^x$ and $f_g{}^x$.

In this configuration, picture quality can be improved to $2f^x{}_{NY} = 6.75$ MHz, which would correspond to the maximum possible luminance bandwidth of a now standardized digital studio. The output signal of filter 5 is fed via amplifier stage 19 to adder stage 20. At the same time, the signal is demodulated by multiplier 17 in synchronism with the transmitting end with a signal at frequency $f_s$ fed to module 6 at terminal 10 at the receiving end, is amplitude weighted in a weighting device 18, and is supplied to the other input of adder stage 20. Synchronization between offset modulation at the transmitting end and the corresponding demodulation at the receiving end can be effected in that—similarly to synchronization during color television transmissions by transmission of a color burst and regulation at the receiving end with the aid of this color burst—an additional synchronizing signal is transmitted as well.

Figure 7:
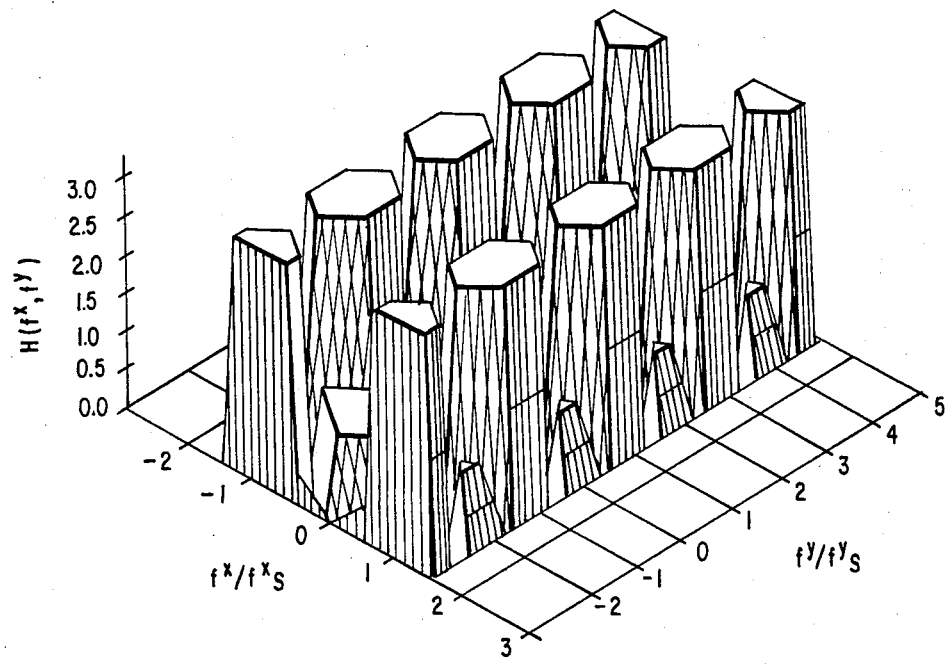
FIG. 7 is a view similar to that of FIG. 2 of the Signal processed at the receiving end before planar postfiltering.

Amplitude weighting at the receiving end is preferably effected with a factor 1/a, i.e., inversely to the amplitude reduction weighting at the transmitting end. The sum of the two signals, at terminal 22, is shown in the spectral illustration of FIG. 7.

The output of module 6 at the receiving end is connected with a lowpass filter 7 for planar postfiltering at the receiving end. At the output 8 of this lowpass filter 7 a signal can be obtained which corresponds to the signal at input terminal 1.

Figure 8:
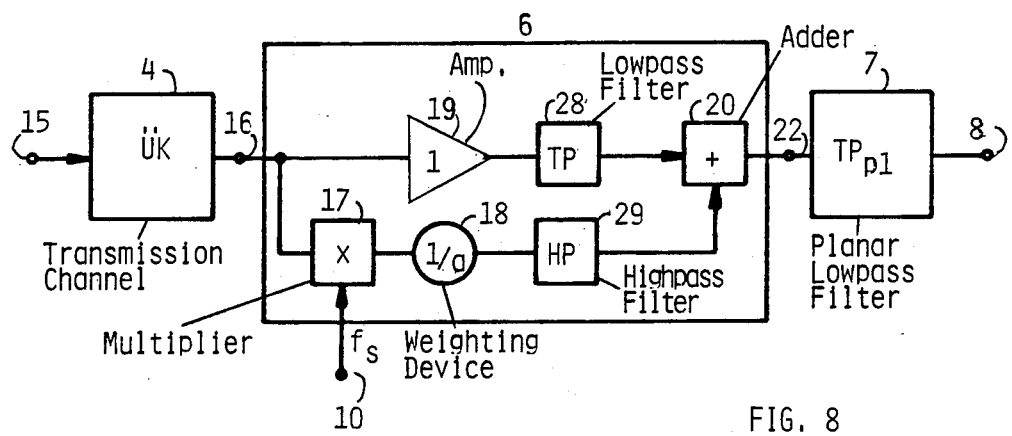
FIG. 8 is a circuit diagram of a modified circuit including highpass/lowpass filtering.
Figure 9:
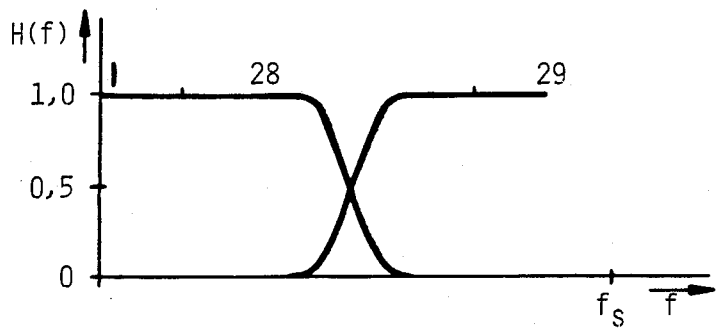
FIG. 9 is a signal diagram of the frequency responses of the complementary highpass/lowpass filters in the circuit of FIG. 8.

In the above-described embodiment, the received signal was bandwidth limited as shown in FIG. 6. In the embodiment of FIG. 8, this bandwidth limitation by lowpass filter 5 is omitted. Instead of lowpass filter 5, a lowpass filter 28 is introduced at the receiving end between amplifier 19 and adder stage 20 and a highpass filter 29 is introduced between weighting device 18 for raising the amplitude and adder stage 20. Lowpass filter 28 and highpass filter 29 must be filters which have complementary filter functions. Their frequency responses H(f) are shown in FIG. 9. The $-6$ dB points on the flanks of lowpass filter 28 and highpass filter 29 must be at the same frequency and may be selected to lie between half the modulation frequency ($=\frac{1}{2}f_s$) and the bandwidth limit of the transmission channel.

Figure 10:
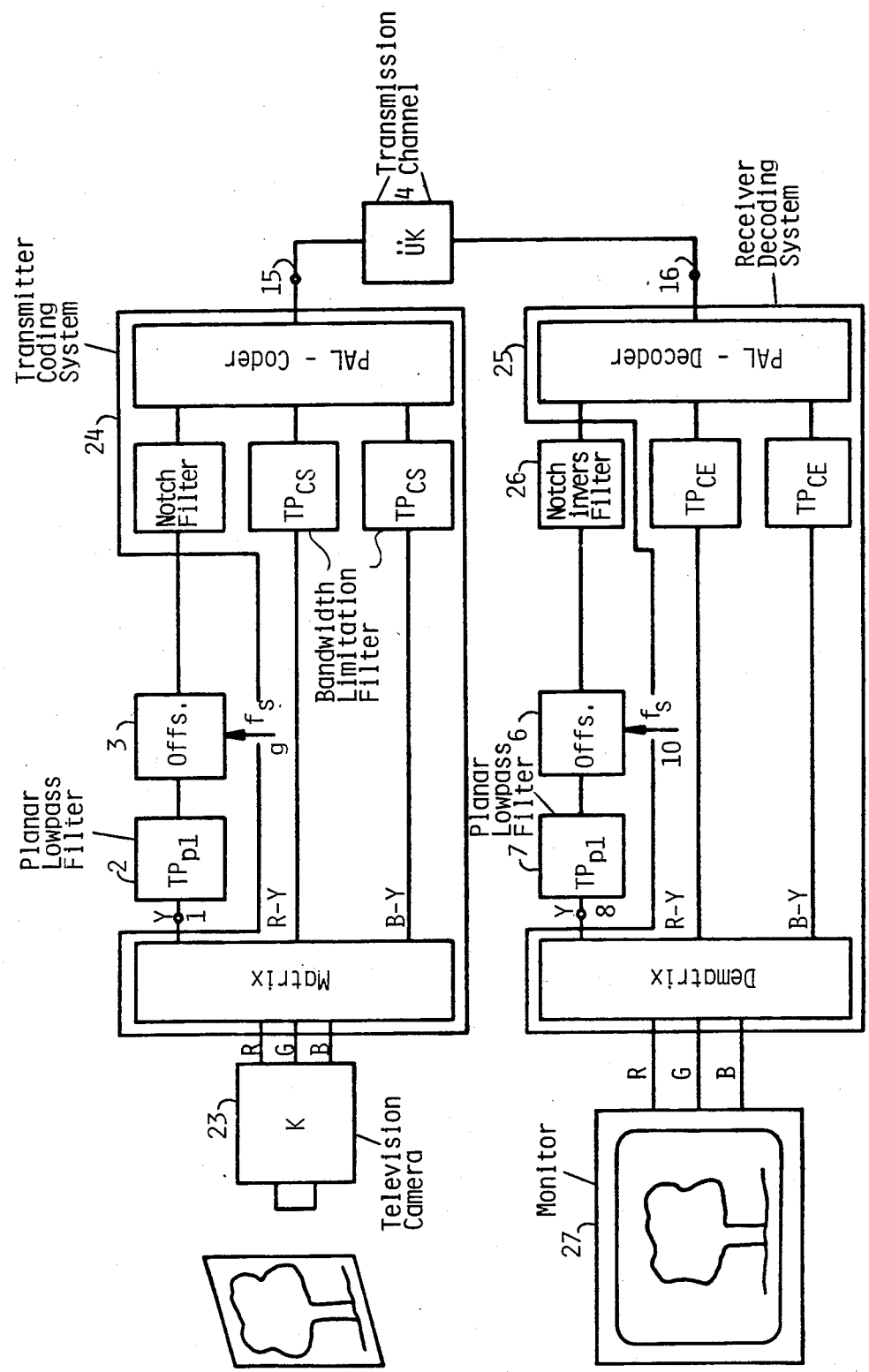
FIG. 10 is a block circuit diagram for color television transmission according to the PAL standard with single-channel transmission of the luminance signal and chrominance signal.

FIG. 10 shows a block circuit diagram of a color television system operating according to the PAL standard. With simple modifications, the system according to the present invention can also be used in transmission systems operating according to the SECAM or NTSC standards. Usage in a SECAM or NTSC standard transmission system is possible by merely adapting the modulation or sampling frequencies and the filter characteristics to these standards. No further modifications are necessary.

A signal source, e.g. a television camera, 23 furnishes color samples of component signals R, G, B which are matrixed in the transmitter side coding system 24 into luminance and color difference signals. The luminance signal samples (terminal 1) are fed to a planar lowpass filter 2 and processed in module 3 corresponding to the embodiment of FIG. 1. The amplitude weighting factor a of device 12 of module 3 must be selected in such a manner that no visible interference components appear at terminal 15 ahead of transmission channel 4. The filter devices "Notch" for chrominance carrier suppression, as well as TP$_{CS}$ for bandwidth limitation of the chrominance type spectra, already exist in conventional coding systems.

After decoding at the receiving end in module 25, it may be necessary to effect frequency response equalization of the luminance channel in module 25 by means of a "notch inverse" filter 26. By including module 6 and planar lowpass filter 7 according to the embodiment of FIG. 1, a luminance signal having an increased signal bandwidth is available at terminal 8. The amplitude weighting factor of device 18 of FIG. 1 must here be selected to be inverse to the amplitude weighting factor of device 12. The dematrixed signals furnish a higher resolution picture quality on the playback monitor 27 at the receiving end. Playback monitor 27 is suitable for full frame display.

Figure 11:
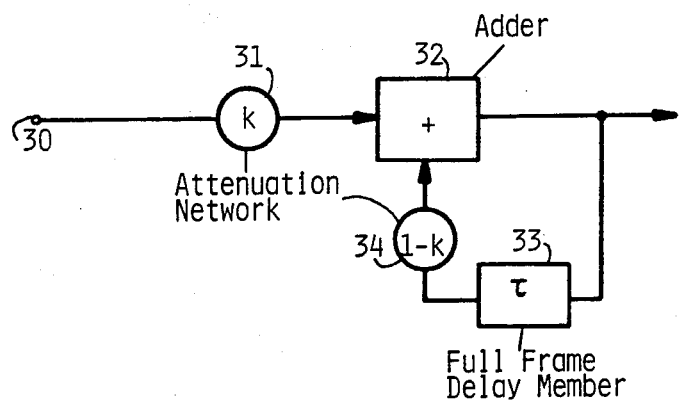
FIG. 11 is a circuit diagram of a circuit unit for time filtering of luminance and chrominance signals according to the recursive filtering concept.
Figure 12:
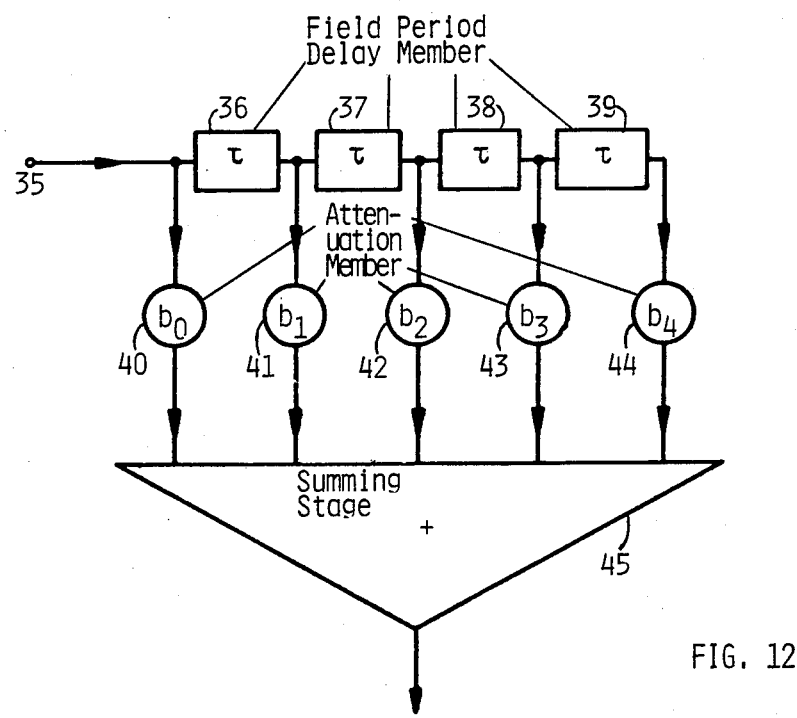
FIG. 12 is a circuit diagram of a circuit unit for time filtering of luminance and chrominance signals according to the transversal filtering concept.

Additional measures may be taken to reduce crosscolor and cross-luminance, for example appropriate timely filtering, which is permissible for unmoving parts of the picture. FIG. 11 shows the devices additionally required for this purpose and the use of recursive filtering while FIG. 12 shows a solution employing transversal filtering. The two methods are known per se from the publications entitled "Compatible Systems for High-Quality Television", SMPTE Journal, July, 1983, pages 719–723, and "High Quality Decoding for PAL Inputs to Digital YUV Studios", BBC Research Department, 1982/12, July 1982. The recursive filtering device according to FIG. 11 is connected ahead of or behind lowpass filter 7 of FIG. 1. Input terminal 30 is connected to an attenuation network 31 whose attenuation factor k lies between 0 and 1. The output of attenuation network 31 is connected to one input of adder 32. The output of this adder 32 is fed back, via a full frame delay member 33 and a further attenuation member 34 having an attenuation factor of $1-k$, to a futher input of adder 32.

In the embodiment of FIG. 12 employing transversal filtering, input terminal 35 is connected with a first delay member 36, which is connected in cascade with further delay members 37, 38, and 39. Delay members 36, 37, 38 and 39 each have a delay of 20 ms—i.e. precisely the period of one field. The outputs of delay members 36, 37, 38 and 39, and the input of delay member 36, are each connected via a respective attenuation member 40, 41, 42, 43 and 44 to a summing stage 45. The coefficients $b_u$ ($u=0, 1, \ldots, 4$) of attenuation members 40, 41, 42, 43 and 44 can each be set within the limits of $-1 \leq b_u \leq =1$. Preferably, coefficients $b_u$ are set to be symmetrical with the center coefficient $b_2$.

Offset modulation cannot be used in moving picture portions. The signal path through modules 11, 12 and 17, 18, respectively, in the transmitter and receiver must be disconnected and the picture content is shown with maximum time resolution and correspondingly reduced local spatial resolution. Motion detectors and accessories are required to make the switch between moving and still picture portions and these may be integrated in the system according to the present invention in the manner shown in FIG. 13.

Figure 13:
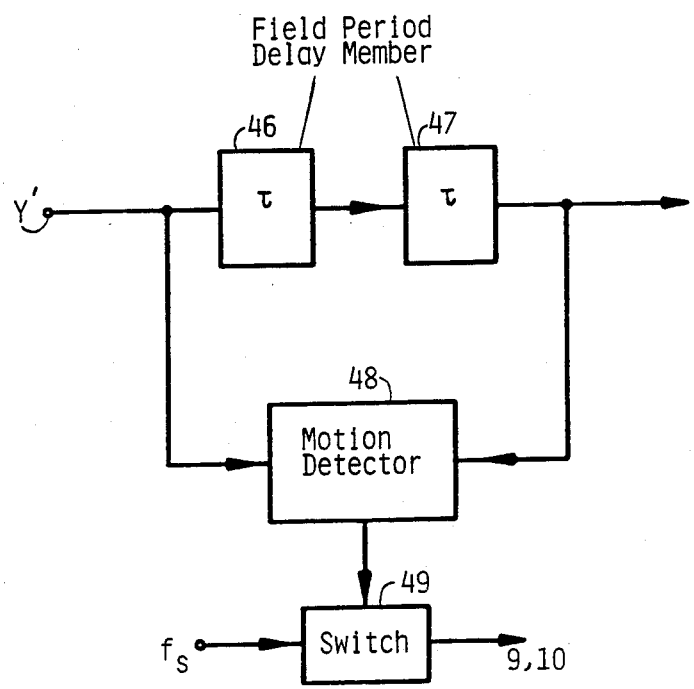
FIG. 13 is a block circuit diagram of a circuit for motion dependent control of the offset modulation with the aid of a motion detector.

Two devices each having the form shown in FIG. 13, are each connected to the signal path of modulation frequency $f_s$, terminals 9 and 10, of a respective one of modules 3 and 6 of FIG. 1. Luminance signal Y passes through two cascade connected delay members 46 and 47, each producing a delay of one field period ($\tau=20$ ms). The input of delay member 46 and the output of delay member 47 are connected to inputs of a motion detector 48 which forms the difference between the delayed and the undelayed luminance signals. If a difference exists, i.e. a moving picture portion has been transmitted, offset modulation is switched off by opening switch 49. The luminance signal is thus transmitted with greater time resolution. If no motion is detected, the system operates with offset modulation as shown in FIG. 1.

Corresponding devices for detection of motion and switching off the offset modulation upon the transmission of moving picture portions are provided at the receiving end. Further embodiments have already been proposed in German Offenlegungsschrift (Laid-open Patent Application) No. P 3,233,882, entitled "System zur fernsehmässigen Übertragung (System for Television Transmission)".

An integrated module Model TDA 1571 manufactured by Valvo can be used for each of multipliers 11 and 17. It is equipped with a limiting stage for offset modulation frequency $f_s$, a filter $f_s$ and an output amplifier stage. The device 12 for amplitude weighting may be composed of an attenuation member including a resistance network ($-\pi$ or T section). The corresponding network 18 at the receiving end is composed, for example, of an operational amplifier suitably equipped with resistors.

The above presented devices for implementing the method have been illustrated for analog signal processing with offset modulation and offset demodulation.

It is possible, in principle, to realize all of the devices with digital equipment as well, using digital signal processing with offset sampling at the transmitting station and sampling conversion at the receiving station. For this embodiment the signal at input terminal 1 of FIG. 1 is then already a digital signal. Module 3 is modified to a digital processing device. Instead of a modulator a digital sampling device is provided with a sampling rate equivalent to $f_s{}^x=6.75$ MHz. Module 6 is also modified to a digital processing device with an appropiate sampling device. A suitable selection of amplitude factor a in a digital weighting device 12 would be, for example a=0.25, 0.3125 or 0.375, since these values, and the inverse factors in device 18, can be easily realized in digital signal representation by shifting the values of individual bits and corresponding sum formation. Filters 2, 5, 7, 28 and 29 would be constructed correspondingly as digital filters known in the art. The required digital/analog conversion must take place, for example, at terminal 8 at the input of the analog monitoring system. Phase and frequency relations concerning offset modulation (analog processing) and offset sampling (digital processing) respectively are identical. With multiple A/D and D/A conversion, it is also possible to realize a mixed system of analog and digital components.

It will be understood that the above description of the present invention is susceptible to various modifications, changes and adaptions, and the same are intended to be comprehended within the meaning and range of equivalents of the appended claims.

What is claim is:

1. In the transmission of a television signal containing a luminance signal over a transmission channel between a transmitting station and a receiving station of a television system, a method for compatibly increasing picture resolution at the receiving station comprising the steps of:
    effecting planar prefiltering of the luminance signal at the transmitting station and a corresponding planar post-filtering of the luminance signal at the receiving station:
    effecting one of offset sampling and offset modulation of the luminance signal at the transmitting station and a corresponding one of sampling conversion and demodulation of the luminance signal at the receiving station;
    deriving an additional signal from the luminance signal for increasing picture resolution, the additional signal having signal components not suitable for transmission over the transmission channel, and reducing the amplitude of the additional signal at the transmitting station to render the signal components of the additional signal suitable for transmission over the transmission channel and transmitting the additional signal to the receiving station; and
    increasing the amplitude of the additional signal at the receiving station to an extent corresponding to the reduction performed during said reducing step.

2. Method as defined in claim 1 further comprising filtering the luminance signal at the receiving station in a lowpass filter having a Nyquist slope before said step of effecting one of sampling conversion and demodulation.

3. Method as defined in claim 2 further comprising effecting additional time filtering of the luminance signal to reduce cross-luminance.

4. Method as defined in claim 1 further comprising effecting lowpass filtering of the luminance signal at the receiving station, and effecting high pass filtering, which is complementary to the lowpass filtering, of the additional signal at the receiving station.

5. Method as defined in claim 4 further comprising effecting additional time filtering of the luminance signal to reduce cross-luminance.

6. Method as defined in claim 1 further comprising effecting additional time filtering of the luminance signal to reduce cross-luminance.

7. Method as defined in claim 1 wherein said step of reducing is effected by modifying the amplitude by a first selected filter function and said step of increasing is effected by modifying the amplitude of the additional signal at the receiving station by a second selected filter function which is complementary to the first selected filter function.

8. Method as defined in claim 7 further comprising filtering the luminance signal at the receiving station in a lowpass filter having a Nyquist slope before said step of effecting one of sampling conversion and demodulation.

9. Method as defined in claim 8 further comprising effecting additional time filtering of the luminance signal to reduce cross-luminance.

10. Method as defined in claim 7 further comprising effecting lowpass filtering of the luminance signal at the receiving station, and effecting high pass filtering, which is complementary to the lowpass filtering, of the additional signal at the receiving station.

11. Method as defined in claim 10 further comprising effecting additional time filtering of the luminance signal to reduce cross-luminance.

12. Method as defined in claim 7 further comprising effecting additional time filtering of the luminance signal to reduce cross-luminance.

13. Method as defined in claim 1 wherein said step of reducing is effected by multiplying the additional signal by a first amplitude factor which has a value less than unity and said step of increasing is effected by multiplying the amplitude of the additional signal at the receiving station by a second amplitude factor having a value which is inverse to that of the first amplitude factor.

14. Method as defined in claim 13 further comprising filtering the luminance signal at the receiving station in a lowpass filter having a Nyquist slope before said step of effecting one of sampling conversion and demodulation.

15. Method as defined in claim 14 further comprising effecting additional time filtering of the luminance signal to reduce cross-luminance.

16. Method as defined in claim 13 further comprising effecting lowpass filtering of the luminance signal at the receiving station, and effecting high pass filtering, which is complementary to the lowpass filtering, of the additional signal at the receiving station.

17. Method as defined in claim 16 further comprising effecting additional time filtering of the luminance signal to reduce cross-luminance.

18. Method as defined in claim 13 further comprising effecting additional time filtering of the luminance signal to reduce cross-luminance.

* * * * *